United States Patent

[11] 3,627,967

| [72] | Inventors | Robert B. Bertolasi;<br>Eiichi Takarada, both of Rockford, Ill. |
|---|---|---|
| [21] | Appl. No. | 45,956 |
| [22] | Filed | June 15, 1970 |
| [45] | Patented | Dec. 14, 1971 |
| [73] | Assignee | Amsted Industries, Incorporated<br>Lone Park, Ill. |

[54] POWER SWITCH SHORT CIRCUIT DETECTOR FOR EDM
13 Claims, 3 Drawing Figs.

[52] U.S. Cl. .................................... 219/69 S, 219/69 C
[51] Int. Cl. ..................................... B23k 9/16
[50] Field of Search ........................... 219/69 S, 69 C

[56] References Cited
UNITED STATES PATENTS

| 2,871,410 | 1/1959 | Matulaitis | 315/120 |
| 3,138,690 | 6/1964 | Webb | 219/69 S |
| 3,257,580 | 6/1966 | Webb | 315/127 |
| 3,301,776 | 1/1967 | Hughes | 204/224 |
| 3,532,850 | 10/1970 | Schulz et al. | 219/69 C |
| 3,524,037 | 8/1970 | Sennowitz | 219/69 S |

Primary Examiner—J. V. Truhe
Assistant Examiner—Gale R. Peterson
Attorney—Wolfe, Hubbard, Leydig, Voit & Osann ABSTRACT: To detect short circuit failures of power switches in electrical discharge machining power supplies, the voltages developed across the power circuits of the power switches are sampled during the normal off periods of the power switches and, if any one of the sampled voltages is below a predetermined threshold level, the power supply is shut down. A trouble-shooting circuit is included so that when a shutdown occurs due to a power switch short circuit failure, the faulty power switch can be quickly located and replaced.

POWER SWITCH SHORT CIRCUIT DETECTOR FOR EDM

BACKGROUND OF THE INVENTION

The present invention relates to electrical discharge machining power supplies, and more particularly to fault detectors for sensing and isolating short circuit failures of power switches in such power supplies.

In electrical discharge machining, which is sometimes also referred to as EDM, arc machining, spark machining, and electroerosion, particles are dislodged from a conductive workpiece by passing a series of discrete, high current density discharges through one or more gaps, each of which is defined between a respective electrode tool and the workpiece. The gap or gaps, as the case may be, are flooded by an ionizable medium, such as a dielectric fluid, which is generally circulated to carry the dislodged particles away from the machining area.

As viewed from the standpoint of any one electrode, the general rule is that each discharge occurs between the most closely spaced electrode and workpiece points. Thus, to machine the workpiece to a desired configuration, each electrode used is designed to contribute to the complement of such configuration. Moreover, a servosystem is normally employed to automatically maintain a predetermined, substantially constant spacing between the electrode and the workpiece.

There are various forms of power supplies for electrical discharge machining, including some designed for single-lead or single-electrode machining and others designed for multilead machining, some intended for pulse mode machining and others intended for capacitor discharge mode machining, and some wherein both the high voltage necessary to initially ionize the gap and the high current required to remove significant amounts of material from the workpiece are supplied by the same source and others wherein separate high voltage and high current supplies are employed.

However, most, if not all, of the known electrical discharge machining power supplies are characterized by including a power switch for each electrode. Each such power switch is opened and closed, i.e., switched between nonconductive and conductive states, to introduce discontinuities in the supply of the machining energy so that a series of discrete discharges such as are required for proper machining are produced between each electrode and the workpiece. The switching is generally affected on a periodic basis, so that the discrete discharges have a predetermined frequency and duty cycle. Further, due to the substantial current involved in electrical discharge machining, each power switch typically comprises a bank or plurality of parallel-connected switching devices, although on occasion a single switching device may be employed.

One of the more common malfunctions in electrical discharge machining power supplies is the failure of a power switch due to manufacturing defects, user abuse, or just ordinary wear and tear. In many power supplies, such as the modern transistorized ones, such a failure generally takes the form of a burned out or short circuit condition, which results in a continuous discharge being established between the electrode associated with the faulty power switch and the workpiece. Such a discharge is undesirable since it does not shift from point to point on the workpiece as required for proper machining, and is potentially damaging to the electrode and workpiece due to the extreme, localized heat that may be generated if it is allowed to persist. Thus, when a power switch short circuit failure occurs, it is important that the power supply be shut down before any irreparable damage is done. At the same time, however, it is desirable to avoid inadvertently shutting down the power supply, since any shutdown necessarily results in the loss of valuable machining time. Also, it is desirable that provision be made to quickly locate or isolate the particular switching device that has failed, so that it can be replaced and the equipment returned to operation as quickly as possible.

Since an operator cannot easily or reliably detect a short circuit failure, short circuit detectors for electrical discharge machining power supplies have heretofore been suggested. For example, Webb U.S. Pat. No. 3,257,580 and Schierholt U.S. Pat. No. 3,399,288 disclose detectors for shutting down the power supply if the leakage current through the power switches reaches an abnormally high level. These detectors are generally satisfactory if the normal leakage current characteristics of the particular switching devices used in the power supply are known with a relatively high degree of certainty, but may on occasion be affected by variant gap conditions, such as the gap voltage polarity reversal sometimes encountered in capacitor discharge mode machining. Moreover, fault detectors which rely on the leakage current level for detection purposes are undesirably sensitive to the different nominal conditions that may be encountered, such as when one switching device within a power switch bank is replaced by a device that has a different nominal leakage current characteristic. Thus, to avoid the necessity of recalibrating such a detector, the nominal leakage current characteristics of any switching device to be used for replacement purposes has to be closely matched to the nominal characteristics of the original switching device.

SUMMARY OF THE INVENTION

An object of the present invention is to provide a new and improved fault detector for sensing short circuit failures of power switches in electrical discharge machining power supplies. More specifically, an object is to provide a fault detector of the foregoing type which is substantially insensitive to variant gap conditions that may occur and which uses a parameter for short circuit detection which is substantially independent of the number of parallel-connected switching devices comprising the power switch.

Another object of this invention is to provide a fault detector for sensing and locating power switch short circuit failures in electrical discharge machining power supplies. A related object is to provide a fault detector of the foregoing type which may be used to advantage in single-lead or multilead power supplies including power switches comprising either a single switching device or a bank of parallel-connected switching devices.

Finally, it is an object of this invention to provide a fault detector of the foregoing type which does not require unusually careful selection of the power switch components or frequent recalibration of the detector, but which is nevertheless highly reliable in operation and suitable for use with a wide variety of existing and new electrical discharge machining power supplies.

BRIEF DESCRIPTION OF THE DRAWINGS

Further objects and advantages of this invention will become apparent when the following detailed description is read in conjunction with the attached drawings, in which.

DETAILED DESCRIPTION OF THE ILLUSTRATED EMBODIMENT

While the invention is described with particularity hereinafter in conjunction with a single illustrated embodiment, it is to be understood that the intent is not to limit it to that embodiment. To the contrary, the intent is to cover all modifications, alternatives, and equivalents that fall within the spirit and scope of the invention as defined by the appended claims.

Figure 1:
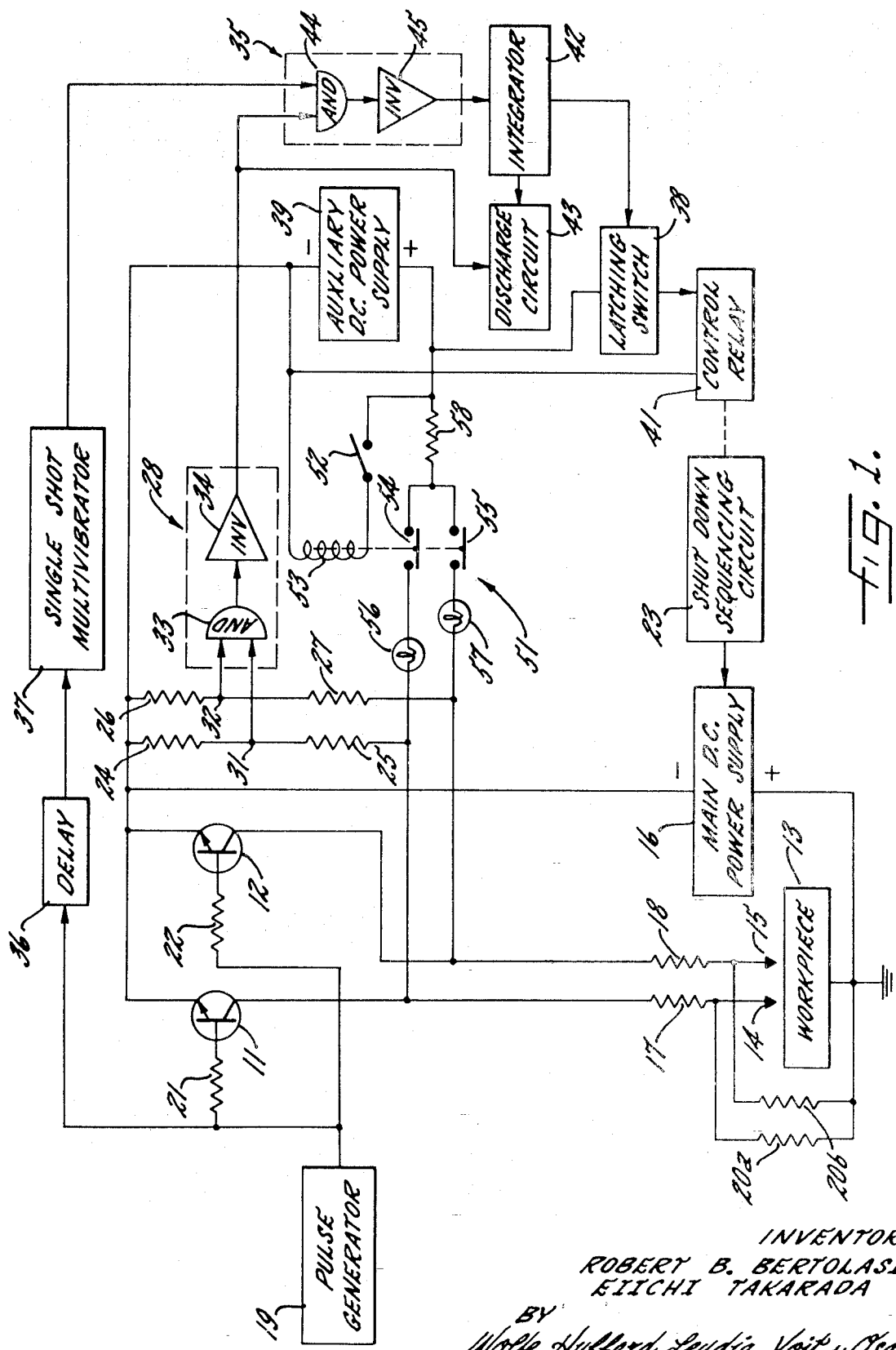
FIG. 1 is a block diagram of a typical fault detector constructed in accordance with the present invention in combination with a simplified, exemplary multilead electrical discharge machining power supply.

Turning now to the drawings, and particularly to FIG. 1, a simplified multilead electrical discharge machining power supply has been selected for illustrative purposes. Specifically, the power supply shown incorporates transistorized power switches 11 and 12, and is designed for pulse mode, normal polarity machining of a workpiece 13 with a pair of spaced electrode tools 14 and 15. However, as the description proceeds, it will become apparent that the fault detector of the present invention is not limited to use with any particular electrical discharge machining power supply. To the contrary, it will be seen that it may be employed with a single-lead or multilead power supplies, which may be designed for pulse or capacitor discharge mode machining with normal or reverse polarity discharges. Moreover, it will be understood that the fault detector here disclosed may be used with power supplies in which each power switch comprises a single switching device or a bank of parallel-connected switching devices and that such power switches may or may not be transistorized.

With the foregoing in mind, it will be seen that in the exemplary electrical discharge machining power supply shown, one side of a main DC power supply 16 is coupled via the collector-emitter or power circuits of the transistors 11 and 12 and respective series-connected, current-limiting resistors 17 and 18 to the electrodes 14 and 15. The other side of the DC supply 16 is coupled to the workpiece 13 and, typically, returned with the workpiece 13 to a point of reference or ground potential.

Figure 2:
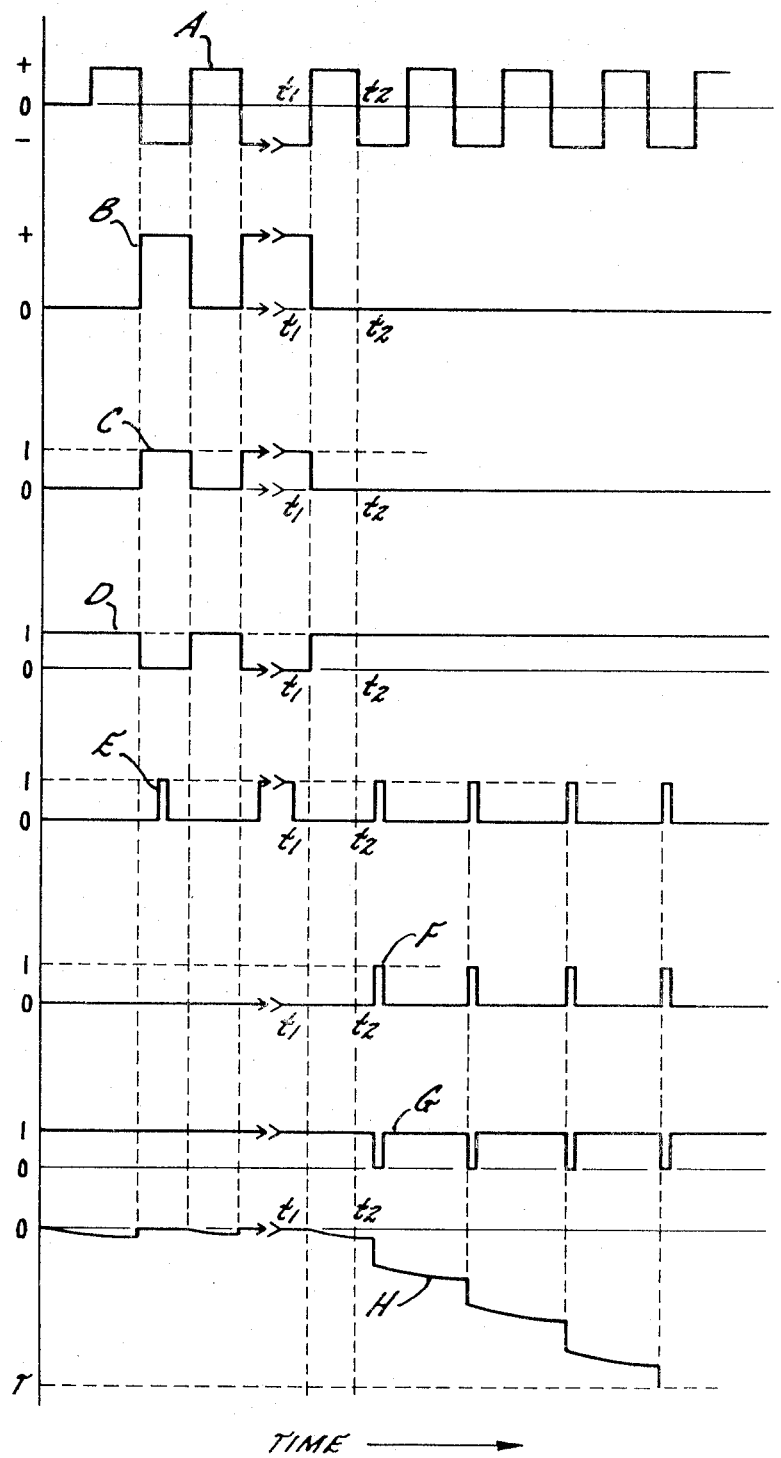
FIG. 2 is a timing diagram to illustrate the relationship with respect to time of the voltages at various points in the circuit depicted by FIG. 1.

Control pulses having a predetermined frequency and duty cycle are supplied by a pulse generator 19 and applied through respective current-limiting resistors 21 and 22 to the base or control circuits of the transistors 11 12. As indicated in FIG. 2, the control pulses A are selected to switch the transistors 11 and 12 between nonconductive states and states of saturated conduction, so that respective series of discrete discharges having the predetermined frequency and duty cycle are passed through the gaps defined between the workpiece 13 and the electrodes 14 and 15. Hence, during normal operation, the collector-emitter voltages B of the transistors 11 and 12 swing between a high open circuit level and a low short circuit level characteristic of the transistors 11 and 12 in their nonconductive and conductive states, respectively. The paths for the current flow responsible for the high open circuit levels of the voltages B are through resistors 20a and 20b shown as being connected across the respective gaps to represent in lumped form various resistances that exist in practice. Of course, such swings are substantially time synchronized with the swings of the control pulses A, since the transistors 11 and 12 tend to switch to their conductive and nonconductive states in response to the leading and trailing edges, respectively, of each pulse A. It should be understood, however, that the synchronism may not be precise. For example, in the case of transistorized power switches, the transistors have inherent storage times that cause some slight delay in their reversion to their nonconductive states in response to the trailing edge of a control or driving pulse. There may, therefore, be a normal corresponding delay (not shown) in the rise times of their collector-emitter or power circuit voltages B.

As will be noted, the phrases "leading edge" and "trailing edge" are used herein to describe the changes in the level of the control pulses A which respectively tend to switch the power switches 11 and 12 into and out of conduction. For the particular embodiment here shown, the leading edges are positive going and the trailing edges are negative going. However, it will be appreciated that in certain other embodiments, for example, say that the power switches 11 and 12 comprise PNP-type transistors for reverse polarity machining of the workpiece 13, the converse would hold true. Thus, the phrases "leading and trailing edge" are to be understood as having no special polarity or sense significance, except as dictated by the requirements of the particular power switches employed.

When a power switch short circuit failure occurs, such as during the period $t_1-t_2$, indicated in FIG. 2, control over the faulty power switch is lost and the impedance of its power circuit drops either directly or progressively toward a permanent, low level, which is generally on the order of the impedance presented by the power circuit when the power switch is in its conductive state. Thus, there is a continued current flow through the power circuit of the faulty power switch to establish a continuous discharge between the associated electrode and the workpiece, with the resultant danger of substantial and irreparable damage being done to the electrode, workpiece, or both unless the supply of current is interrupted relatively quickly. The speed with which the current supply must be cut off to obviate the possibility of irreparable damage depends on a number of variables, such as the composition of the workpiece, the composition of the electrode, and the current level of the continuous discharge. As a general rule of thumb, in most situations, a response which results in the interruption of the current flow within approximately 10 to 20 times the period of the control pulses A is sufficiently fast.

In accordance with a primary feature of the present invention, for detecting the drop in the impedance of the power circuit of a power switch that is characteristic of a short circuit failure of the power switch, provision is made for determining whether the amplitudes of the power circuit voltages B developed during the normal off periods (or periods of nonconduction) of the power switches 11 and 12 are above or below a threshold level. If the amplitude of any one of the power circuit voltages B is below the threshold level during the normal off periods of the power switches, a signal is supplied to actuate a sequencing circuit 23 which, in turn, disables or shuts down the main DC power supply 16 in accordance with a predetermined program. Both the sequencing circuit 23 and the program carried out thereby may be conventional, such as have been used heretofore for shutting down the power supply at the completion of a machining run.

Advantage is taken of the fact that the substantial drop in the open circuit impedance of a faulty power switch causes a proportional drop in the voltage B developed across its power circuit during its normal off periods, regardless of the number of switching devices comprised by the power switch and substantially independently of the existing gap conditions. Moreover, due to the extent of the drop in the power circuit voltage B of the faulty power switch, the threshold level can be set to detect short circuit failures at a relatively early stage, without requiring that it be reset, even if the operating characteristics of switching devices used for replacement purposes do not match those of the originals. Thus, any replacement required may be selected at random from a supply of spares, and the time-consuming and expensive matching procedures may be avoided. Of course, the threshold level to be selected depends on the type of power switches that are to be monitored for short circuit failures. However, for exemplary purposes, it is noted that satisfactory operation has been obtained with electrical discharge machining power supplies having transistorized power switches by setting the threshold level to provide short circuit failure detection in response to a drop in the power circuit impedance of any power switch during its normal off period to below about 200 ohms.

For the illustrated multilead power supply, to carry out the foregoing feature of the invention, there are respective resistive voltage dividers 24, 25 and 26, 27 which are connected across the collector-emitter power circuits of the transistors 11 and 12, and a coincidence-type gate 28 which has its input coupled to the voltage divider midpoints 31 and 32. The ratios of the voltage dividers 24, 25 and 26, 27 are selected to reduce the amplitudes of the collector-emitter voltages B of the transistors 11 and 12 by a factor sufficient to bring them within the voltage ratings of the components used in the coincidence gate 28, and the values of the individual resistors 24–27 therein are selected to limit the current flow through the voltage dividers so that it has no substantial effect on the gap conditions.

The coincidence gate 28 monitors the collector-emitter voltages B of the transistors 11 and 12 to provide an output signal that is at one logic level when the amplitudes of such voltages are both above the threshold level and at the opposite logic level when the amplitude of one or both is below the threshold level. Preferably, the response of the gate 28 to a short circuit failure is affirmative. Thus, as here shown, it is a NAND gate, such as may typically be formed by an AND-gate 33 and series-connected inverting stage 34. The AND-gate 33 provides an output signal C that is at a high (or "1") logic level only when the amplitudes of the collector-emitter voltages B are both above the threshold level. The inverter 34, on the other hand, supplies the compliment thereof, so that the output signal D from the NAND-gate 28 is at a high ("1") level when the amplitudes of either or both of the collector-emitter voltages B are below the threshold level.

From the foregoing, it will be understood that the coincidence gate 28 is required only for multilead power supplies. However, it is noted that for single-lead power supplies, to afford the digitizing action of the coincidence gate 28, a bistable circuit or the like (not shown) may be used instead of the gate.

For discriminating between normal conduction of the transistors 11 and 12 and a short circuit failure of one or both of them, there is a second coincidence gate 35 which has one input coupled to receive the output signals D from the coincidence gate 28 and another input coupled to receive sampling pulses E. The sampling pulses E are synchronized with the control pulses A, so that the sampling is affected during the normal off periods of the transistors 11 and 12. Conveniently, such sampling pulses E are derived from the pulse generator 19. Thus, as here shown, connected between the pulse generator 19 and the gate 35 there is a delay circuit 36 and a single-shot or monostable multivibrator 37, the first to delay the control pulses A for a period sufficient to compensate for whatever storage time the transistors 11 and 12 may possess, and the latter to provide the sampling pulses E in time synchronism with and at a frequency of the control pulses A during the normal off periods of the transistors 11 and 12.

As can be seen, when a short circuit failure occurs, the coincidence gate 35 provides an output signal which operates a latching switch 38 to complete an energizing circuit from an auxiliary DC power supply 39 to a control relay 41 which, in turn, actuates the shutdown-sequencing circuit 23. Preferably, an integrating circuit 42 or the like is included between the coincidence gate 35 and the latching switch 38 to filter out extraneous voltages that may be induced into the system by the substantial amounts of electromagnetic noise and interference generated in electrical discharge machining. To provide effective filtering without inhibiting the production of a firing signal for the latching switch 38 when a short circuit failure occurs, there is a gated discharge circuit 43 for the integrator 42. During normal operation of the power supply, the discharge circuit 43 is gated to fully discharge the integrator 42 each time the output signal D from the coincidence gate 28 indicates that the transistors 11 and 12 are both in their nonconductive states; i.e., each time the output signal D drops to a low (or "0") logic level.

In the particular embodiment here shown, the latching switch 38 requires a negative-going firing pulse. Thus, the coincidence gate 35 is a NAND gate, which again may typically be formed by an AND-gate 44 and a series-connected inverting stage 45. As will be appreciated, the AND-gate 44 provides an output signal F which is at a high ("1") logic level only in the presence of a sampling pulse E and then only if one or both of the transistors 11 and 12 has suffered a short circuit failure. The inverter stage 45, on the other hand, supplies the compliment of the signal F as the output signal G from the NAND-gate 35. Hence, during normal operation of the power supply, the output signal H from the integrator circuit 42 periodically reverts to substantially a zero level due to the gating of the discharge circuit 43 and is, therefore, effectively limited. However, when a short circuit failure of one or both transistors 11 and 12 occurs, the output signal H of the integrating circuit 42 builds stepwise in synchronism with the sampling pulses E along the characteristic curve of the integrator circuit to a negative level T at which the latching switch 38 is triggered.

In keeping with another aspect of the present invention, provision is made for isolating the faulty power switch. As will be appreciated, this is of particular importance of the larger multilead power supplies, which may have upwards of 50 separate power switches. Thus, there is a trouble-shooting circuit 51 which is actuated by closing a switch 52 to energize a relay coil 53 which pulls in its associated contacts 54 and 55 to put respective indicators, such as lamps 56 and 57, in series between the auxiliary DC power supply 39 and the collector-emitter circuits of the transistors 11 and 12. As will be appreciated, the short circuit failure is readily located, since current is drawn from the auxiliary DC power supply 39 through the current-limiting resistor 58 by the power circuit of the faulty power switch, thereby causing the lamp in series therewith to light.

Figure 3:
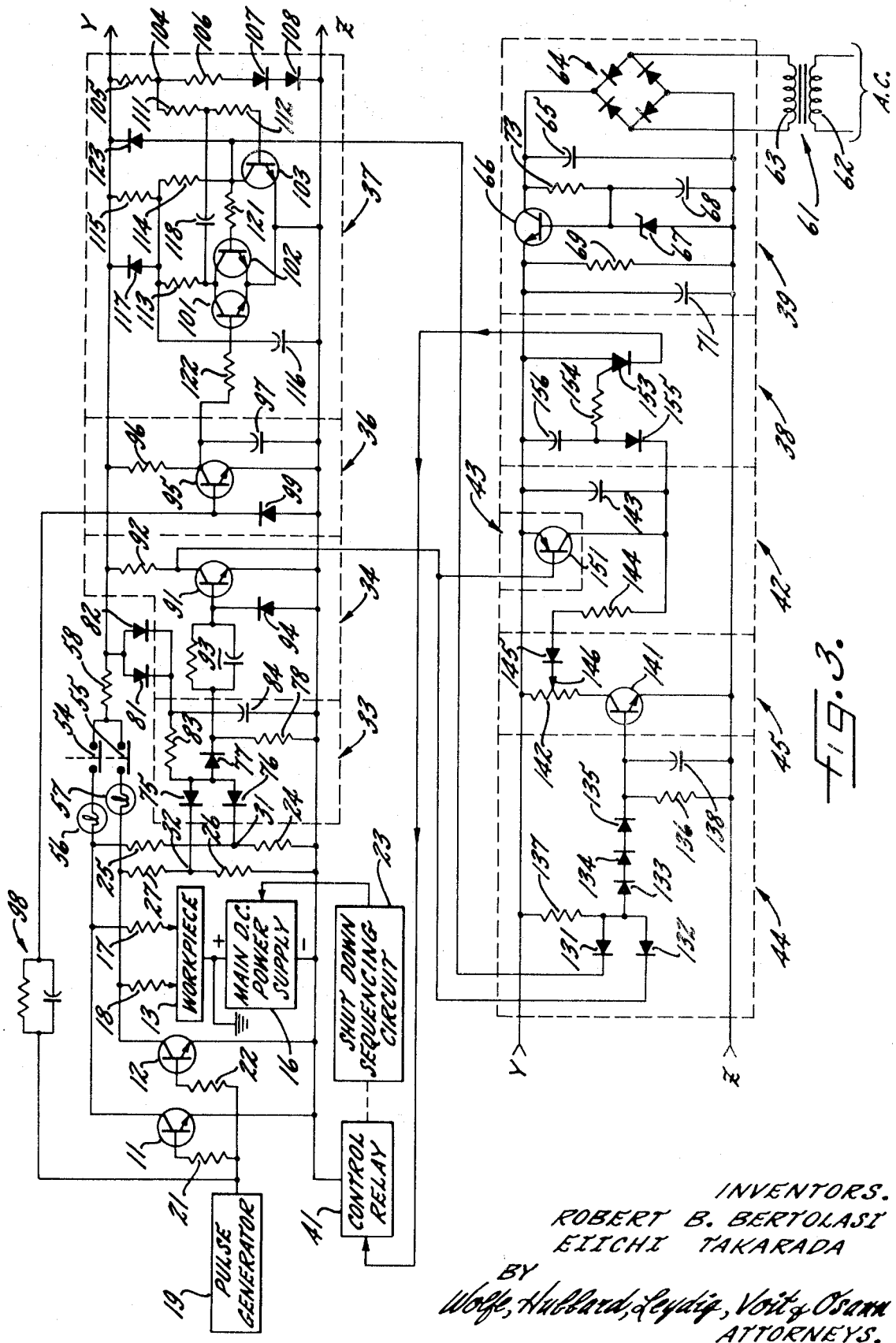
FIG. 3 is a simplified electrical schematic diagram of the fault detector and multilead electrical discharge machining power supply combination shown in FIG. 1.

With the foregoing in mind, attention is now directed to FIG. 3 for a discussion of the more detailed aspects of the power switch short circuit failure detector here shown.

Turning first to the auxiliary DC power supply 39, it will be seen that it is a regulated AC to DC converter which derives the DC voltage required to power the various components of the detector circuit from the usually readily available AC line voltage. More particularly, as here shown, there is an input transformer 61, which has its primary winding 62 connected across the AC line and a secondary winding 63 connected across the input of a full-wave rectifier, such as a diode bridge 64. The pulsating DC voltage appearing across the output of the diode bridge 64 is smoothed by a shunt-connected filtering capacitor 65 and then applied to the collector of a transistor 66. The transistor 66 is, in turn, connected as a series voltage regulator with a Zener diode 67 and parallel-connected filtering capacitor 68 in its base circuit, and a load resistor 69 and further parallel filtering capacitor 71 connected in shunt with its emitter. Driving current for the transistor 66 is drawn through a current-limiting resistor 73 which is connected between the positive terminal of the smoothing capacitor 65 and the base of the transistor. The value of the resistor 73 is selected to assure that the reverse breakdown potential for the Zener diode 67 is exceeded under all operating conditions, thereby insuring that there is substantially constant driving voltage for the transistor 66 which, in turn, insures that DC voltage appearing across the final filtering capacitor 71 on the buses Y and Z remains at a substantially constant amplitude, despite the changes that inherently occur from time to time in the load into which such voltage is fed.

The AND-gate 33 is a generally conventional low level logic circuit comprising a respective diode 75 and 76 for each of its inputs and yet another diode 77 which feeds into a load resistor 78. The operation of AND-gates in this general type is well known and, therefore need not be described in detail here. However, it is noteworthy that special provision is made in the bias circuit for the AND-gate 33 to insure that it remains operative for a short period after the auxiliary DC power supply 39 is shut down, i.e., after the filter capacitors 65 and 71 of the auxiliary DC power supply have discharged. To this end, the operating bias for the AND-gate 33 is derived from the bus Y and applied through a pair of parallel-connected diodes 81 and 82 and a resistor 83 to the commonly connected anode terminals of the diodes 74–77. A storage capacitor 84 is connected in shunt from a junction between the diodes 81, 82 and the resistor 83 to the bus Z. Thus, when the supply of AC power to the auxiliary DC power supply 39 is interrupted (by means not shown), the filter capacitors 65 and 71 start to discharge to, in turn, back bias the diodes 81 and 82. The diodes 81 and 82, therefore, act as blocking diodes, forcing the capacitor 84 to discharge through the load resistor 83 and appropriate ones of the diodes 75–77 depending on the states of conduction of the transistors 11 and 12. The discharge time constant for the capacitor 84 is selected to be long relative to those of the capacitors 65 and 71. Hence, it will be seen that the discharge current from the capacitor 84 provides operating bias for the AND-gate 33 for a short period after the auxiliary DC power supply 39 is shut down to thereby protect against a false indication of a power switch short circuit failure.

To provide the compliment of the AND gate output signal C as the NAND gate output signal D, the inverter stage 34 comprises a transistor 91 which is connected in common emitter configuration with a load resistor 92 in its collector circuit. A fast response time is insured by using an RC-circuit 93 for coupling the AND gate output signals C to the base of the transistor 91, and the base-emitter junction of the transistor is protected by a shunt-connected diode 94 poled to clamp any reverse voltage surges that may occur.

The delay circuit 36 comprises a transistor 95 which is connected in common emitter configuration with a load resistor 96 in its collector circuit and a delay capacitor 97 connected across its collector-emitter terminals. The control pulses A are supplied from the pulse generator 19 via an RC-coupling circuit 98 to the base of the transistor 95, and the base-emitter junction thereof is protected by a shunt-connected clamping diode 99. The transistor 95 inverts the control pulses A and the capacitor 97 shifts their phase or delays them, so that inverted and delayed control pulses A are available for triggering the single-shot multivibrator 37.

The single-shot multivibrator 37 here shown includes a pair of transistors 101 and 102 which have their collector-emitter circuits connected in parallel and which are normally nonconductive, and another transistor 103 which is normally biased into conduction by current drawn from the midpoint 104 of a temperature-compensated voltage divider 105–108 through a pair of current-limiting resistors 111 and 112. The collectors of the transistors 101 and 102, on the one hand, and of the transistor 103, on the other, are connected by respective load resistors 113 and 114 and a shared voltage-dropping resistor 115 to the positive bus Y, and their emitters are all returned to the negative bus Z. In keeping with accepted practices, to filter out high-frequency noise, an AC bypass capacitor 116 is connected across the collector-emitter circuits of the transistors 101–103. To provide a low-impedance discharge path for rapidly discharging the capacitor 116 when the detector circuit is shut down there is a diode 117 connected across the resistor 115.

To obtain the characteristic action of a single-shot multivibrator, there is a capacitor 118 cross coupled from a junction 119 between the current-limiting resistors 111 and 112 in the base circuit of the transistor 103 to the collectors of the transistors 101 and 102, and a resistor 121 cross coupled from the base of the transistor 102 to the collector of the transistor 103. The inverted and delayed control pulse A from the delay circuit 36 are applied via a current-limiting resistor 122 to the base of the transistor 101. Thus, it will be seen that during each normal off period of the transistor power switches 11 and 12, the transistor 101 is switched into conduction to thereby divert the driving current for the transistor 103 through the capacitor 118 such that the transistor 103 is switched out of conduction. This, in turn, causes the voltage at the collector of the transistor 103 to increase, so that the transistor 102 is almost simultaneously switched into conduction. At the same time, the capacitor 118 begins to charge, so that decreasing amounts of current are drawn thereby, with the result that the transistor 103 is switched back into conduction after a short period determined by the charging time constant for the capacitor 118. Hence, as will be appreciated, sampling pulses E are produced across the transistor 103 in time synchronism with and at the frequency of the control pulses A during the normal off periods of the transistor power switches 11 and 12. As shown, another reversely poled diode 123 is included to prevent any reverse voltage surges from degrading the sampling pulses E.

The AND-gate 44 is again a generally conventional low level logic circuit comprising a respective diode 131 and 132 for each of its inputs and a string of series-connected diodes 133–135 feeding into a load resistor 136. Operating bias for the diodes 131–135 is supplied from the positive bus Y through a current-limiting resistor 137. It should be understood that the diode string 133–135 is used to insure that the combined forward voltage drop that must be overcome to cause the AND-gate output signal F to change from its low ("0") level to its high ("1") level is sufficiently large that the noise voltages that may be present are generally not of sufficient amplitude to trigger the change. Further provision is made to eliminate undesired noise by connecting an AC bypass capacitor 138 in parallel with the load resistor 136.

The inverter stage 45 comprises a transistor 141 which is connected in common emitter configuration with a resistive load 142 in its collector circuit. The output signals F from the AND-gate 44 are applied to the base of the transistor 141 and inverted thereby appear in complimentary form at its collector as the NAND gate output signals G. Preferably, the load 142 is a potentiometer or the like to afford adjustment of the high ("1") level of the NAND gate output signals G to thereby compensate for whatever leakage losses there may be in the integrating circuit 42.

The integrating circuit 42 comprises a capacitor 143 which is charged negatively relative to the positive bus Y whenever the transistor 141 is in a partially or fully conductive state. As will be seen, the charging current is drawn through a resistor 144, a diode 145, the portion of the potentiometer 142 below its slider 146, and the collector-emitter circuit of the transistor 141. While an idealized waveform for the NAND gate output signal G has been shown in FIG. 2, to simplify the more important points of the description, it will be understood that in practice, despite the provision made to eliminate them, there generally are induced noise voltages which cause the transistor 141 to conduct at more or less randomly distributed points other than those indicated by the waveform G. It is the purpose of the integrator 42 to prevent such random noise voltages from creating a false indication of a power switch short circuit failure.

The discharge circuit 43 comprises a transistor 151 which has its collector-emitter circuit connected across the integrating capacitor 143. The transistor 151 is periodically switched into conduction during normal operation of the transistor power switches 11 and 12 to prevent the voltage H on the integrating capacitor 143 from building to a sufficient level for triggering the latching switch 38. To this end, the base of the transistor 151 is connected to the collector of the transistor 91 in the inverter stage 34. During normal operation of the transistor power switches 11 and 12, the transistor 91 is switched into conduction during the off periods of the transistors 11 and 12 to, in turn, switch the transistor 151 into conduction. Hence, the collector-emitter circuit of the transistor 151 periodically becomes a low-impedance path for rapidly discharging the capacitor 143 to a substantially zero level. However, when a short circuit failure occurs, the transistor 91 and, therefore, the transistor 151 remain in their nonconductive states. The voltage H on the capacitor 143 then builds stepwise in synchronism with the sampling pulse E to the triggering level T for the latching switch 38.

The latching switch 38 in the illustrated embodiment is a silicon-controlled rectifier 153 which has its anode-cathode or power circuit connected between the positive bus Y and the control relay 41, and its gate connected via a current-limiting resistor 154 and a noise inhibiting diode 155 to the output of the integrator circuit 42. An AC bypass capacitor 156 is connected across the gate cathode control circuit of the controlled rectifier 153 to filter out any high-frequency noise components not blocked by the prior noise filtering and masking provisions and to provide a path for reset current flow.

From the foregoing, it will now be appreciated that the present invention provides an improved power switch short circuit failure detector which is suitable for use with a wide variety of different single and multilead electrical discharge machining power supplies. It will be understood that the detector here disclosed eliminates many of the problems that have been encountered heretofore in attempting to use short circuit failure detectors to monitor the power switches of electrical discharge machining power supplies by operating substantially independently of the number of parallel-connected switching devices comprised by the power switches and the gap conditions existing at the time of the short circuit failure. It will also be understood that the detector need not be recalibrated, even if the switching devices used in the power switches of the power supply for replacement purposes are not matched to the switching devices replaced. Finally, it will be seen that provision has been made for quickly locating any short-circuited power switch, so that it can be replaced and the power supply returned to operation with little loss of valuable machining time.

We claim as our invention:

1. In combination with an electrical discharge machining power supply including pulse-generating means for supplying control pulses, and a power switch having a power circuit connected in series with a first DC source and an ionizable gap defined between an electrode and a conductive workpiece, together with a control circuit coupled to said pulse-generating means for alternately switching said power switch on and off in response to said control pulses, whereby a series of discrete discharges are passed through said gap to machine said workpiece; detector means for detecting any short circuit failure of said power switch comprising sensing means coupled across the power circuit of said power switch and responsive to the amplitude of the voltage developed thereacross for providing a first signal when the amplitude of said voltage is below a predetermined threshold level, circuit means coupled to said pulse-generating means for supplying sampling pulses in timed synchronism with said control pulses during the normal off periods of said power switch, first coincidence gate means coupled to said sensing means and said circuit means for providing an output signal in response to the concurrence of said first signal with a sampling pulse, and switch means between said gate means and said first source for disabling said first source in response to said output signal.

2. The combination of claim 1 wherein said switch means includes a latching switch which is triggered to initiate the disabling of said first source by the application of a triggering signal; and further including an integrating circuit coupled between said first gate means and said latching switch for integrating the output signal supplied by said first gate means to provide said triggering signal when said power switch suffers a short circuit failure, a normally nonconductive discharge circuit connected to said integrating means, and gating means coupled to said discharge circuit for enabling it to discharge said integrating circuit in timed synchronism with said control pulses during the off periods of said power switch under normal operating conditions, whereby said latching switch is triggered only when said power switch suffers a short circuit failure.

3. The combination of claim 2 wherein said first gate means is a NAND gate, said integrating means includes a capacitor, said discharge circuit includes a switching device with a power circuit connected across said capacitor and a control circuit coupled to said gating means whereby said capacitor is discharged through the power circuit of said switching device when said device is switched into a conductive state, and said latching switch comprises a silicon-controlled rectifier with a gate cathode control circuit connected across said capacitor.

4. The combination of claim 2 wherein said circuit means comprises delay means for delaying said control pulses by an amount sufficient to compensate for any storage time of said power switch, and a monostable multivibrator coupled to said delay means and responsive to the delayed control pulses supplied thereby for providing said sampling pulses.

5. The combination of claim 2 further including a second DC source for powering said detector means, and wherein said sensing means includes a storage means which is charged by said second source during operation of said detector means and which gradually discharges through said sensing means when said second source is disabled to maintain an operating bias on said sensing means for a short period following a shutdown of said detector means.

6. The combination of claim 1 wherein said power supply comprises a plurality of power switches each with a power circuit connected between said first DC source and a respective ionizable gap defined between an associated electrode and said workpiece, and a control circuit coupled to said pulse-generating means and responsive to said control pulses for alternately switching said power circuit on and off, and wherein said sensing means includes a second coincidence gate means having a plurality of inputs each of which is coupled to the power circuit of a respective one of said power switches, whereby said first signal is at one level when the amplitude of any of the voltages developed across said power circuits is below said threshold level and at another level when the amplitudes of such voltages are all above said threshold level, and wherein said first coincidence gate means provides said output signal when said first signal is at said one level concurrently with the presence of a sampling pulse.

7. The combination of claim 6 wherein said switch means includes a latching switch which is triggered to initiate the disabling of said first source by the application of a triggering signal; and further including an integrating circuit coupled between said first gate means and said latching switch for integrating the output signal supplied by said first gate means to provide said triggering signal when said power switch suffers a short circuit failure, a normally nonconductive discharge circuit connected to said integrating means, and gating means coupled to said discharge circuit for enabling it to discharge said integrating circuit in timed synchronism with said control pulses during the off periods of said power switch under normal operating conditions, whereby said latching switch is triggered only when said power switch suffers a short circuit failure.

8. The combination of claim 7 wherein said gating means is comprised by said second gate means.

9. The combination of claim 8 wherein said first gate means is a NAND gate such that said output signal is negative going, said integrating means includes a capacitor, and said discharge means comprises a transistor having a collector-emitter circuit connected across said capacitor and a base connected to said second gate means, said transistor being switched into conduction to discharge said capacitor to substantially a zero level when said first signal is at said other level.

10. The combination of claim 6 wherein said first and second gate means are respective NAND gates.

11. The combination of claim 6 further including a second DC source for powering said detector means, and a plurality of indicator means each connected in a normally open series circuit between said second DC source and the power circuit of a respective one of said power switches, and means coupled to said series circuits for closing them to thereby complete an energizing circuit for any one of said indicator means that is in series with the power circuit of a power switch that has suffered a short circuit failure.

12. The method of detecting any short circuit failure of a power switch in an electrical discharge machining power supply, said power switch being connected in series between a DC source and a gap defined between an electrode and a conductive workpiece and being alternately switched on and off during normal operation to cause a series of discrete discharges to pass through said gap to machine said workpiece, said method comprising the steps of monitoring the amplitude of the voltage developed across the power circuit of said power switch to provide a signal when the amplitude of such voltage is below a predetermined threshold level, and sampling said signal during the normal off periods of said power switch to discriminate between any short circuit failure of said power switch and its normal on periods.

13. The method of claim 12 further including the step of initiating a shutdown of said power supply when said signal appears during a normal off period of said power switch.

* * * * *